United States Patent (10) Patent No.: US 8,285,846 B2
Pyhälammi et al. (45) Date of Patent: *Oct. 9, 2012

(54) SYSTEM, APPARATUS AND METHOD FOR ASSOCIATING AN ANTICIPATED SUCCESS INDICATION WITH DATA DELIVERY (75) Inventors: Seppo Juhani Pyhälammi, Espoo (FI); Tapio Hameen-Anttila, Espoo (FI); Tero-Markus Saarinaa, Helsinki (FI); Tuomo Sihvola, Espoo (FI); Niko Makila, Nurmijarvi (FI); Tuomas Santeri Artman, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,110

(22) Filed: Oct. 17, 2011

(65) Prior Publication Data

US 2012/0036223 A1 Feb. 9, 2012

Related U.S. Application Data (63) Continuation of application No. 11/823,660, filed on Jun. 28, 2007, now Pat. No. 8,065,429.

(51) Int. Cl.
*G06F 15/173* (2006.01)
(52) U.S. Cl. ........ 709/224; 709/202; 709/203; 709/217; 709/219; 709/228; 709/232; 709/233; 709/235; 717/120; 717/124; 717/127; 717/172; 717/177; 717/178
(58) Field of Classification Search .................. 709/203, 709/217, 220, 223, 227, 232, 202, 219, 224, 709/233, 235
See application file for complete search history.

(56) References Cited

U.S. PATENT DOCUMENTS

| | | | |
|---|---|---|---|
| 5,715,294 A | 2/1998 | Pester, III | |
| 5,913,040 A * | 6/1999 | Rakavy et al. | 709/232 |
| 6,195,697 B1 | 2/2001 | Bowman-Amuah | |
| 6,253,240 B1 | 6/2001 | Axberg et al. | |
| 6,745,011 B1 | 6/2004 | Hendrickson et al. | |
| 6,886,045 B1 * | 4/2005 | Halasz et al. | 709/245 |
| 6,941,266 B1 * | 9/2005 | Gorin et al. | 704/257 |
| 6,944,662 B2 | 9/2005 | Devine et al. | |
| 7,103,558 B1 | 9/2006 | Patton et al. | |
| 7,103,668 B1 * | 9/2006 | Corley et al. | 709/231 |
| 7,136,357 B2 | 11/2006 | Soumiya et al. | |

(Continued)

OTHER PUBLICATIONS

Admob, "Why Mobile Advertising", http://www.admob.com/learn_more.php, (printed from Internet Jun. 28, 2007).

(Continued)

*Primary Examiner* — Michael Won
(74) *Attorney, Agent, or Firm* — Ditthavong Mori & Steiner, P.C.

(57) ABSTRACT

Systems, apparatuses and methods for determining success rates for the transfer and/or utilization of transmitted applications or other communicated services. An intermediary device specifies one or more device attributes of a target device, which are received at a server. The server determines an anticipated success rate for successfully transferring the requested content to the device and/or utilizing the content at the target device, and transfers an indication of the anticipated success rate to the intermediary device. The anticipated success rate indication is received at the intermediary device, which then determines whether the received anticipated success rate indication meets threshold criteria. If so, the intermediary device notifies the server to initiate the transfer of the content from the server to the target device if the threshold criteria is met.

16 Claims, 7 Drawing Sheets

U.S. PATENT DOCUMENTS

| | | | |
|---|---|---|---|
| 7,136,909 B2 | 11/2006 | Balasuriya | |
| 7,243,351 B2 | 7/2007 | Kundu | |
| 7,254,609 B2 * | 8/2007 | Hart et al. | 709/203 |
| 7,409,454 B2 | 8/2008 | Wynn et al. | |
| 7,414,973 B2 | 8/2008 | Hart et al. | |
| 7,418,376 B1 | 8/2008 | Feldstein et al. | |
| 7,428,588 B2 | 9/2008 | Berstis et al. | |
| 7,454,408 B2 | 11/2008 | Koffron | |
| 7,489,628 B2 | 2/2009 | Pirbhai et al. | |
| 7,548,977 B2 | 6/2009 | Agapi et al. | |
| 7,555,546 B1 | 6/2009 | Anumala | |
| 7,573,821 B2 | 8/2009 | Chilukoor et al. | |
| 7,584,294 B2 | 9/2009 | Plamondon | |
| 7,703,102 B1 | 4/2010 | Eppstein et al. | |
| 8,065,429 B2 * | 11/2011 | Pyhalammi et al. | 709/232 |
| 2001/0044835 A1 | 11/2001 | Schober et al. | |
| 2002/0010759 A1 | 1/2002 | Hitson et al. | |
| 2002/0114295 A1 * | 8/2002 | Takahiro et al. | 370/329 |
| 2002/0133587 A1 | 9/2002 | Ensel et al. | |
| 2002/0138617 A1 | 9/2002 | Christfort et al. | |
| 2002/0165912 A1 | 11/2002 | Wenocur et al. | |
| 2002/0174220 A1 | 11/2002 | Johnson | |
| 2003/0069848 A1 | 4/2003 | Larson et al. | |
| 2003/0073440 A1 | 4/2003 | Mukherjee et al. | |
| 2003/0172139 A1 | 9/2003 | Srinivasan et al. | |
| 2003/0172175 A1 | 9/2003 | McCormack et al. | |
| 2003/0191823 A1 | 10/2003 | Bansal et al. | |
| 2003/0221008 A1 | 11/2003 | England et al. | |
| 2004/0142691 A1 | 7/2004 | Jollota et al. | |
| 2005/0054381 A1 | 3/2005 | Lee et al. | |
| 2005/0172024 A1 | 8/2005 | Cheifot et al. | |
| 2005/0228875 A1 | 10/2005 | Monitzer et al. | |
| 2006/0056437 A1 * | 3/2006 | Fishwick | 370/412 |
| 2007/0002736 A1 | 1/2007 | Gade et al. | |
| 2007/0016688 A1 | 1/2007 | Hester et al. | |
| 2007/0061429 A1 | 3/2007 | Lin | |
| 2007/0192490 A1 | 8/2007 | Minhas | |
| 2007/0206506 A1 | 9/2007 | Purpura | |
| 2007/0214247 A1 * | 9/2007 | Yang et al. | 709/223 |
| 2007/0283002 A1 | 12/2007 | Bornhoevd et al. | |
| 2008/0025216 A1 * | 1/2008 | Singh et al. | 370/231 |
| 2008/0117869 A1 | 5/2008 | Freen et al. | |
| 2008/0137588 A1 * | 6/2008 | Santhanam | 370/320 |
| 2008/0222621 A1 | 9/2008 | Knight et al. | |
| 2008/0306798 A1 * | 12/2008 | Anke et al. | 705/8 |
| 2010/0031366 A1 | 2/2010 | Knight et al. | |
| 2010/0082805 A1 | 4/2010 | Orton et al. | |
| 2010/0100623 A1 | 4/2010 | Wulff et al. | |

OTHER PUBLICATIONS

Final Office Action for related U.S. Appl. No. 11/823,660 dated Oct. 12, 2010, pp. 1-33.
Non-Final Office Action for related U.S. Appl. No. 11/823,660 dated Apr. 29, 2010, pp. 1-18.
Non-Final Office Action for related U.S. Appl. No. 11/823,660 dated Feb. 3, 2011, pp. 1-23.
WidSets, Frequently Asked Questions, https://www.widsets.com/faq, (printed from Internet May 22, 2007).
WidSets, Web and Mobile Release, http://blog.widsets.com/widsets/2007/02/release.html, Feb. 28, 2007 (printed from internet May 22, 2007).

* cited by examiner

FIG. 7B

SYSTEM, APPARATUS AND METHOD FOR ASSOCIATING AN ANTICIPATED SUCCESS INDICATION WITH DATA DELIVERY

CROSS-REFERENCE TO RELATED APPLICATIONS

This application is a continuation of U.S. patent application Ser. No. 11/823,660 filed on Jun. 28, 2007, the entirety of which is incorporated herein by reference.

FIELD OF THE INVENTION

This invention relates in general to data communications, and more particularly to systems, methods and apparatuses for deriving anticipated success rates for content delivery.

BACKGROUND OF THE INVENTION

Advances in communication infrastructures and devices have turned standard communication devices into valuable tools. Device users can communicate with each other, and with other electronic devices, over networks ranging from Local Area Networks (LANs) to wide reaching Global Area Networks (GANs) such as the Internet. Wireless communications devices such as mobile phones, personal digital assistants and the like are often designed to interface with such networks as well as with their local surroundings using short-range wireless technologies.

Both landline and wireless computing systems are presently capable of receiving information in a variety of content types and formats, from a variety of different sources including networked sources. Landline systems, such as desktop computers, workstations, terminals, etc. generally utilize commercially-available Web browsers in order to interact with various kinds of Internet resources. This type of browser is generally a software program stored locally at the client device. In the Internet context, web content created with Hypertext Markup Language (HTML) or other language can be read by such Web browsers. Analogous technologies exist for communicating landline content via wireless devices.

There is an ever-increasing demand for the consumption of Internet or other network-sourced content on smaller devices such as mobile phones, personal digital assistants, laptop computers and the like. For example, the popularity and resulting proliferation of these portable and/or hand-held wireless devices has fueled the need to make content traditionally available to desktop and other landline computing systems also available to mobile device users. Today, these wireless devices not only facilitate voice communication, but also messaging, multimedia communications, e-mail, Internet browsing, and access to a wide range of wireless applications and services.

As a result of the proliferation of wireless technologies, a multitude of different device types having different capabilities are currently available. A vast quantity of applications and services has become available to these devices, and the quantity of such applications and services available to these devices will continue to grow. In addition to new applications/services being available to these devices, the corresponding software residing on these devices may be subject to revisions, version upgrades and the like. However, the resulting fragmentation of systems, operating systems, networks, terminal capabilities, and/or other distinctive characteristics has caused some fragmentation in the use of services. When a device user attempts to download or otherwise receive content, service applications, software, etc., the device to which such data is targeted may not always result in a successful download, and/or may not be compatible in that the downloaded data does not operate correctly on the device. Currently, the user has no way of knowing whether his or her device is likely to successfully download the data or to successfully execute/utilize the application, content or other data.

Accordingly, there is a need in the communications industry for a manner of notifying prospective data consumers of the likelihood of successfully downloading, executing or otherwise using the content, application, software or other data to which he or she is seeking to acquire. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for ascertaining success rates for the transfer and/or utilization of transmitted applications or other communicated services.

A method is provided in accordance with one embodiment of the invention. The method includes specifying device attributes of a device, and in response receives an anticipated success indication for transferring content to the device and/or rendering software in the device with one or more of the device attributes. The received anticipated success indication is compared to a threshold success indication. Based on a result of the comparison, at least one of initiating transfer of the content and rendering software in the device is facilitated.

According to a more particular embodiment of such a method, one or more network attributes associated with a network by which the transfer of the content to the device will be effected are specified, and the anticipated success indication is received in response to specifying the device attributes and the network attributes.

In another embodiment, specifying one or more device attributes of a device involves specifying the device attributes over a network via a networked device distinct from the device. In an alternative embodiment, specifying one or more device attributes of a device involves specifying the device attributes over a network via the device itself.

In other embodiments of such a method, specifying device attributes may involve specifying information identifying the device and/or information identifying capabilities of the device. In another embodiment, specifying one or more device attributes involves selecting the device attributes in response to a presented prompt(s) for the device attributes. In yet another embodiment one or more additional device attributes of the device are specified, and in response is the receipt of an updated anticipated success indication for transferring the content to the device based on the device attribute (s) and the additional device attribute(s) of the device.

In still another embodiment, receiving an anticipated success indication for rendering software in the device further involves receiving the anticipated success indication for executing the software at the device in response to specifying at least the device attribute(s). In another embodiment, comparing the received anticipated success indication to a threshold success indication involves comparing the received anticipated success indication to a threshold success indication to determine whether the anticipated success indication is greater than the threshold success indication, and automatically initiating the transfer of the content to the device and/or the rendering of the software in the device if the received anticipated success indication is greater than the threshold success indication.

In another embodiment of such a method, facilitating selective initiation of a transfer of the content to the device involves presenting at least one user-selectable option for specifying whether or not to initiate the transfer of the content to the device. In yet another embodiment, the device is a mobile device capable of wireless communication.

According to another embodiment of the invention, a method is provided for associating an anticipated success indication with data delivery. The method includes receiving, such as via a server, one or more device attributes of a device and an identification of requested content. An anticipated success rate for successfully transferring the requested content to the device and/or utilizing the content at the device is determined, and the indication of the anticipated success rate is transmitted.

In another embodiment of such a method, the content includes software, and determining an anticipated success rate thus involves determining the anticipated success rate for both successfully transferring the requested software to the device and successfully implementing the requested software on the device. According to another embodiment, transferring the anticipated success rate indication involves transferring the anticipated success rate indication to an intermediary/proxy computing system from which a decision whether to initiate a download of the requested content to the device is specified.

One embodiment further involves modifying an encoding of the requested content based on the determined anticipated success rate. A more particular embodiment further involves modifying the encoding of the requested content to reduce a size of the requested content when network traffic has increased. Another particular embodiment involves modifying the encoding of the requested content to reduce a size of the requested content when network traffic is projected to increase, consequently increasing the determined anticipated success rate.

In another embodiment, determining an anticipated success rate involves determining the anticipated success rate based on a first set of information including the one or more device attributes of the device. A more particular embodiment involves receiving one or more additional device attributes of the device, and determining the anticipated success rate based on both the first set of information and on a second set of information including the one or more additional device attributes.

In embodiments of such a method, receiving one or more device attributes may involve any one or more of receiving information identifying the device, information identifying capabilities of the device, etc. Another embodiment further or alternatively involves receiving information regarding network attributes associated with a network by which the transfer of the content to the device will be effected. A more particular embodiment further involves determining the anticipated success rate based on the one or more device attributes and the information regarding the network attributes.

In still another embodiment, determining an anticipated success rate involves determining the anticipated success rate based on the device attribute(s) and on historical success rates for transferring the requested content at different encoding levels. In another embodiment, determining an anticipated success rate involves determining the anticipated success rate based on the device attribute(s) and on historical success rates for transferring the requested content at different encoding levels in different geographical areas. In yet another embodiment, the device is represented by a mobile device capable of wireless communication.

In accordance with another embodiment of the invention, an apparatus is provided that includes at least transmitting, receiving and processing modules. The transmitting module is configured to transmit one or more attributes of a target device. The receiving module is configured to, in response to transmitting the one or more target device attributes, receive an anticipated success indication for transferring content to the target device and/or utilizing software in the device with one or more of the target device attributes. The processing module is configured to determine whether the received anticipated success indication meets threshold criteria, and to allow initiation of the transfer of the content to the target device and/or utilizing of the software in the target device if the threshold criteria is met.

According to one embodiment, the apparatus is implemented in an intermediary (e.g., proxy) device distinct from the target device. In one embodiment, the proxy device involves a computing device capable of communicating over one or more networks. In an alternative embodiment the apparatus is implemented in the target device itself.

Still another embodiment involves the transmitting module transmitting at least information identifying the target device as the one or more target device attributes. In another embodiment the transmitting module transmits at least information identifying capabilities of the target device as the one or more target device attributes.

In accordance with another embodiment of the invention, a server is provided that includes a database to store content, a receiving module, a processing module, and a transmitting module. The receiving module is configured to receive one or more device attributes of a device and an identification of requested content from the database. The processing module is configured to determine an anticipated success rate for successfully transferring the requested content to the device and/or utilizing the content at the device based on at least the one or more device attributes. The transmitting module is configured to transmit an indication of the anticipated success rate in response to having received the one or more device attributes and the identification of the requested content.

In one embodiment, the receiving module is further configured to receive one or more network attributes associated with one or more networks expected to be involved with a transfer of the requested content to the device, and the processing module is further configured to determine the anticipated success rate based on at least the one or more network attributes. In yet another embodiment, the processing module is further configured to determine the anticipated success rate based on at least one or more of date and time.

According to another embodiment of the invention, a method is provided. The method involves specifying, via a proxy device, one or more device attributes of a target device. The device attributes and an identification of requested content are received at a server that determines an anticipated success rate for successfully transferring the requested content to the device and/or utilizing the content at the target device, and transfers an indication of the anticipated success rate to the proxy device. The proxy device receives the anticipated success rate indication, determines whether the received anticipated success rate indication meets threshold criteria, and notifies the server to initiate the transfer of the content from the server to the target device if the threshold criteria is met.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention is directed to systems, apparatuses and methods for ascertaining success rates for the transfer and/or utilization of transmitted applications or other communicated services.

For example, there are a wide variety of device types, and an even wider variety of services (e.g., applications and/or other software) that devices may use. In addition, software often undergoes new releases, version upgrades and the like. The fragmentation of systems, operating systems, networks, terminal capabilities and/or other differentiating environment attributes can lead to or otherwise contribute to the fragmentation of service usage. The present invention involves the utilization of a success rate factor(s) that provides guidance for future usage. When such success rate indicators are used in connection with, for example, the provisioning of services on a device, the service offerings in fragmented fields can be enhanced by the use of the established success rate for that combination of device and/or network environment attributes. For example, users can be notified of how well an application has worked in a similar type of device before the user attempts to download that application to his or her device. This facilitates a better user experience having numerous possibilities, such as targeted service offerings and/or recommendations based on the user device and success rate history for that device, device capabilities, and/or network environment conditions.

Figure 1:
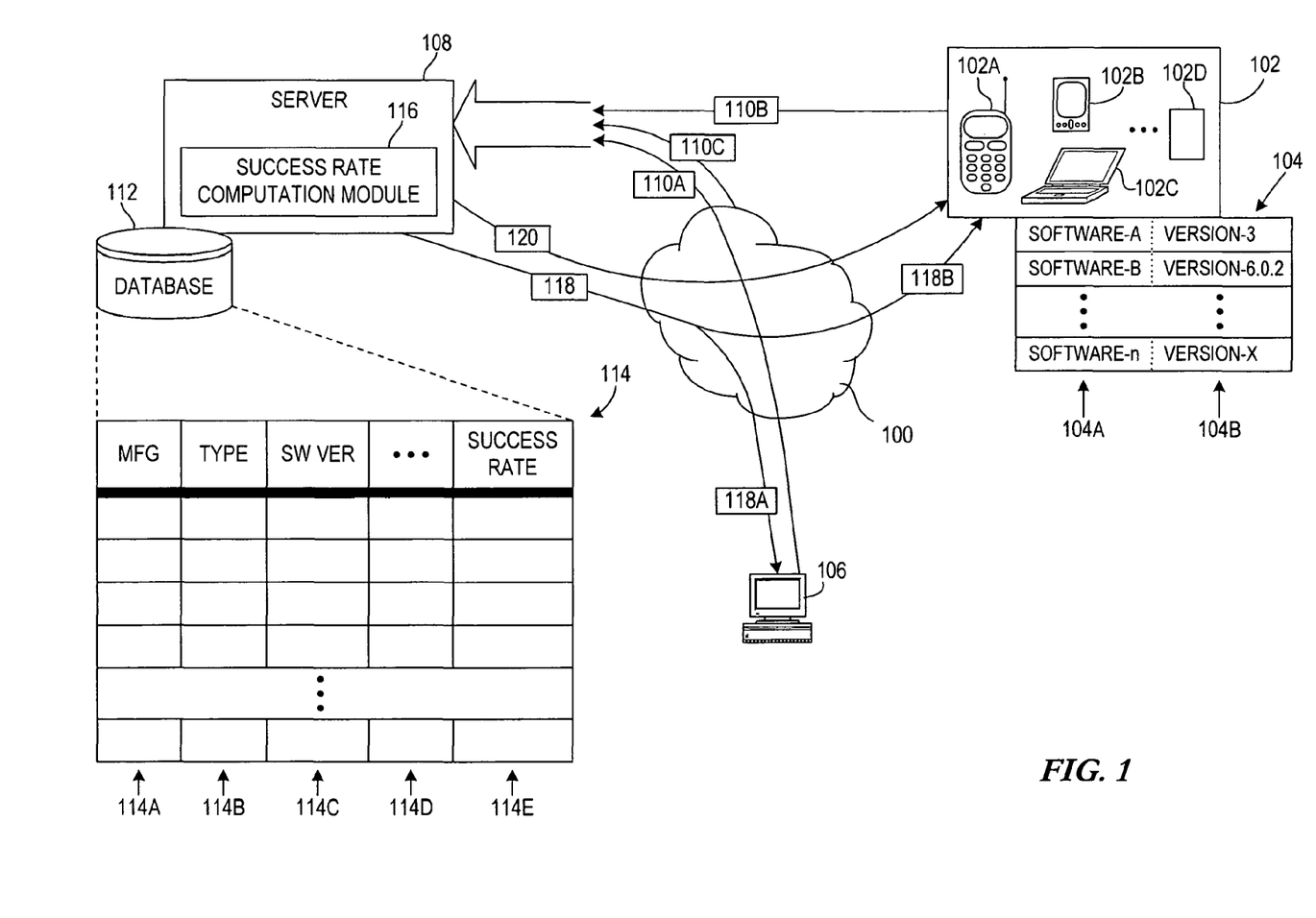
FIG. 1 illustrates a representative system for providing a success-based usability index according to one embodiment of the invention.

One representative embodiment of a system for providing a success-based usability index is shown in FIG. 1. In the example of FIG. 1, communication is facilitated by way of one or more networks 100, which may include any type of network(s) such as infrastructure-based networks, proximity networks, peer-to-peer networks, etc. One or more of the devices may also communicate directly using non-network communication mechanisms (e.g., direct connection).

The embodiment of FIG. 1 involves a device 102, such as a mobile device capable of communicating information wirelessly. For example, a mobile device may include a mobile phone 102A, personal digital assistant 102B, laptop/notebook computing system 102C or other 102D device capable of at least wireless communication. While the device 102 need not be a mobile device, and can alternatively be a desktop/workstation or other processing/communication device in accordance with the invention, the device 102 of FIG. 1 is represented as a mobile device. In the illustrated embodiment it is assumed that the device 102 can receive, store and/or otherwise utilize certain content. Examples of such content include applications, programs or other software (used interchangeably herein) that can be utilized by way of the mobile device 102. In the illustrated embodiment, it is assumed that content, such as a new software item or upgraded software item, is to be considered for downloading to the mobile device 102. For example, the mobile device 102 may store various software items 104, represented by particular software item 104A and possibly a corresponding version 104B. In the illustrated embodiment, the mobile device is the target of a possible addition of a new software item 104A, and/or an upgraded version 104B to an existing software item 104A. It should be recognized, however, that the present invention is equally applicable to situations where the mobile device 102 is the target of content other than a software item, such as different formats of images, video, audio, etc.

In accordance with one embodiment of the invention, a device identifies a software item(s) (or other content) to possibly download to the mobile device 102. In one embodiment, the mobile device 102 itself identifies the downloadable software item, and in another embodiment another device identifies the downloadable software item on behalf of the mobile device 102. For example, a computing device 106 or other communication device operable on the network 100 can serve as a proxy to identify the content for downloading to the mobile device 102, as well as provide information and responsively receive a success rate indication for effecting a download of the content to the mobile device 102. Embodiments are described in greater detail below. For purposes of FIG. 1, it is assumed that the computing device 106 performs the functions of identifying the relevant download factors and the content for downloading to the mobile device 102, and receives the success rate indication(s) for effecting the download of the content.

As previously indicated, certain software, software upgrades, or other content may or may not work effectively on certain devices 102, and/or may involve other factors that may affect the downloading of the content to the mobile device 102. The present invention enables information to be provided to, and/or collected by, a system such as the server 108 to ascertain an approximate likelihood of effecting a successful transfer and/or operation of the content on the target device 102. In the embodiment of FIG. 1, the computing device 106 provides some information 110A to facilitate the desired content download. This information may include, for example, any one or more of the target device 102 type, model, manufacturer, operating system, terminal capabilities, user preferences, etc. As shown in FIG. 1, none, one or more of these information items 110B may alternatively or additionally be provided by way of the target device 102 itself. Other information may alternatively or additionally be provided, such as network attributes 110C. Such network attributes may include, for example, any one or more of network traffic conditions and/or network congestion state, network type (e.g., GSM, CDMA, etc.), network downloading restrictions, available quality of service, date or time of day (e.g., anticipated high network traffic periods), network routing or re-routing issues (e.g., a local server being down and a more remote content provider being relied upon), and the like.

A network element, such as the server(s) 108, receives such information. The server 108 may include, or otherwise have access to, a database 112. The database 112 collects the information of the various devices 102, as depicted by the exemplary database contents/information 114. Such information 114 may include, for example, the device 102 manufacturer 114A, device 102 type 114B, software version 114C, and/or any other relevant information 114D. For the various devices (e.g., device 102 and others) that provide such information to the server(s) 108, a success rate for downloading and/or executing such content on the same or similar device can be computed using, for example, the success rate computation module 116 at the server 108. Thus, the success rate computation module 116 can store an anticipated success rate 114E for historical success rates for similar devices and/or under similar download conditions.

When the computing device 106 and/or mobile device 102 provides the information 110A/B/C to the server 108, a corresponding success rate for downloading and/or executing the content on the device 102 can then be obtained from the database 114.

The appropriate success rate 114E can then be provided 118 back to the computing device 106 as shown by path 118A and/or to the mobile device 102 itself as shown by path 118B. In the case of providing this success rate to the computing device 106 via path 118A, the computing device 106 can then automatically, or by way of user input, initiate the downloading of the desired content to the mobile device 102. For example, if the success rate for executing the desired content on the device 102 is shown to be 2%, the user may choose not to download the content, or may choose to take an alternate action. As another example, the computing device 106 may be programmed to automatically initiate a download attempt of the desired content from the server 108 to the mobile device 102 if the received success rate is above a threshold value. Numerous options are available to the requesting device 106/102 upon receiving the anticipated success rate indicator for the desired content download. If the computing device 106 or the mobile device 102 initiates the transfer, the content 120 is then provided to the mobile device.

Figure 2A:
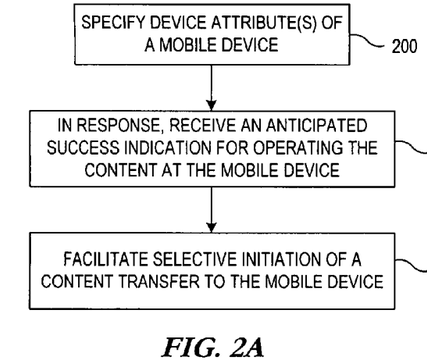
FIGS. 2A and 2B are flow diagrams illustrating exemplary embodiments of providing a success usability index in accordance with the invention.

FIG. 2A is a flow diagram illustrating one exemplary embodiment of a manner for providing a success usability index in accordance with the invention. In the illustrated embodiment, the target device for receiving the software or other content is a mobile device. One or more device attributes of the mobile device are specified 200. These device attributes can include any attribute, capability, preference or other characteristic attributable to the mobile device. Such attributes may involve information enabling the server to detect or otherwise identify the type of target device. By way of example and not of limitation, such device attributes may include the actual manufacturer of the mobile device, device model, firmware or other version, etc. Other attributes may include terminal capabilities, such as the language, location, supported content types, network or network operator, camera, operating system, browser version(s), screen size, pixel ratio, memory capacity, etc.

In response to specifying such information, an anticipated success indication for operating the content at the mobile device is received 202. In one embodiment the anticipated success indication is received at a device different from the target mobile device, such as a computing device. In another embodiment, the target mobile device itself can be the recipient of the anticipated success indication. As previously indicated, the anticipated success indicator provides an indication of a likelihood of success of operating the content on the target mobile device. The "content" may be software, such that the success rate indicator indicates the success rate of executing that software on the type of target device defined by at least the device attributes specified at block 200. The content may be other types of content, such as content for presentation, which can include images, audio, video, etc. Further, the success indication for "operating" the content may include the likelihood of successfully executing software, presenting visual and/or audio content, downloading the content, etc. Thus, unless otherwise indicated, the operating of the content may alternatively or additionally include downloading or otherwise transferring the content.

The method of FIG. 2A includes facilitating 204 the selective initiation of a content transfer to the target mobile device. For example, the selective initiation may be a manual initiation of the content transfer by the user. The user may receive the success rate indicator via the target mobile device or via another device such as a computing device, and can initiate the content transfer by way of, for example, a user interface. In other embodiments, the receiving device can automatically initiate the transfer based on some criteria, such as if the success rate indicator is above a certain threshold, where the threshold can be any success rate (e.g., including zero or hundred percent).

Figure 2B:
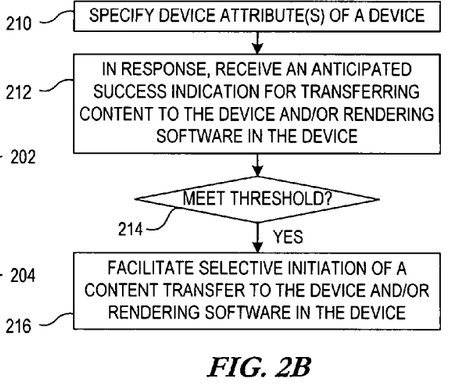

The flow diagram of FIG. 2B illustrates another representative embodiment of providing a success usability index in accordance with the invention. One or more device attributes of the device are specified 210. In response, an anticipated success indication for transferring content to the device, and/or for rendering software in the device, is received 212. Thus, the anticipated success indication can be used for at least one of the process of transferring content to the device and rendering software in the device. By using the anticipated success indication for at least one of the transferring and rendering of software, it is not intended that the system be capable of providing the anticipated success indication for both the transferring of content and rendering of software, although that may be the case. As a more particular example, where the content is a device-independent media item (e.g., bitmap image), the system may only be interested in an anticipated success indication for the transfer of the content. As another example, the content may be media that may not be capable of being executed on many devices (e.g., certain video formats, audio formats, etc.) or relates to software that may not be executable on certain devices. In such a case, the anticipated success indication may be for one or both of the transferring of the content and rendering included software. The term "rendering" is used broadly herein, meaning any use, operation, execution, etc. of the software on the device.

In the embodiment of FIG. 2B, it is determined whether the anticipated success indication is acceptable. In one embodiment, this determination is made by comparing the received anticipated success indication to a threshold success indication, as depicted at decision block 214. If the received anticipated success indication is acceptable as determined by the comparison to the threshold success indication, selective initiation of the content transfer and/or rendering of the software is facilitated 216.

Figure 3:
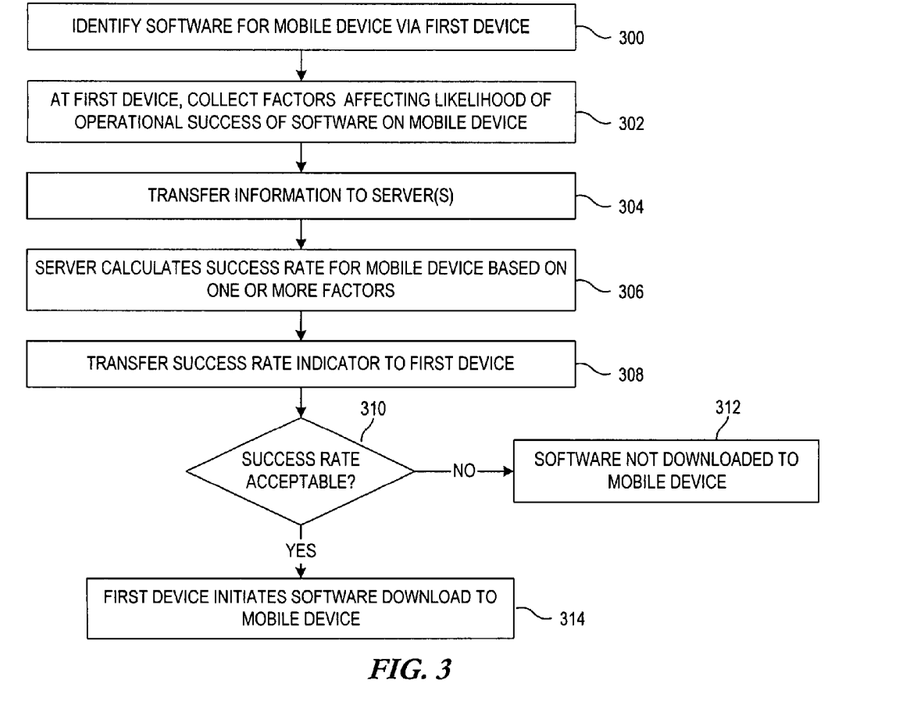
FIG. 3 illustrates another representative embodiment of a method for providing success rate indicator in accordance with the invention.

FIG. 3 illustrates another representative embodiment of a method for providing success rate indicator. In the illustrated embodiment, the content to be transferred is software that is executable on a target mobile device. The software may include at least one or more programs and/or one or more program updates that are to be transferred to, and executed by, a mobile device such as a mobile phone, personal digital assistant, computing device, etc. The success rate indicator of the embodiment of FIG. 3 can indicate the likelihood of successfully downloading and/or executing or otherwise utilizing the software on the target mobile device.

Referring to FIG. 3, the software desired for downloading to the mobile device is identified 300 via a first device. In the illustrated embodiment, this first device is another device capable of communicating with a server(s) to effect the transfer of the software to the target mobile device. For example, a desktop computer, workstation, laptop/notebook computer or other computing device may represent the first device in the embodiment of FIG. 3. At this first device, certain information or "factors" that may affect the likelihood of operational (including downloading) success of the software on the mobile device are collected 302. For example, a computer representing the first device may accept input via a user input from a user who specifies at least some of the information ultimately used by the server(s) to determine the success rate indicator. As a more particular example, such information entered via a user input may include terminal characteristics, such as mobile device manufacturer, model, version, firmware version, etc. The information may alternatively or additionally include terminal capabilities such as, for example, screen/display size, device language, location, supported content types, network, camera, operating system, browser version(s), memory capabilities, display resolution, pixel ration, etc. The information may alternatively or additionally include network-related information which may be provided via the first device user and/or via detection mechanisms. For example, such network-related information may include network traffic conditions (e.g., congestion level), type of network, operator, etc. The network-related information may also include network "restrictions," such as, for example, whether the network is a standard GSM network, whether a certain protocol is available (e.g., High-Speed Downlink Packet Access; HSDPA), time of day, latency detection, etc. Other information may also be provided that affects the success rate calculation, such as historical data. For example, such data may include historical data based on encoding for downloading/installing/executing a particular item, user feedback regarding the success, etc. Still other information may alternatively or additional be involved such as geographical data, such as the geographical data based on encoding where the target device and/or the server(s) is (e.g., country, city, hotspot). Any information that may be used in a determination of the likelihood of successfully downloading and/or using the software (or other content) may be involved.

The first device or other device that collects this information then transfers 304 it to a server(s), which is generically used herein as any system or network element that has processing capabilities to calculate the success rate indicator and communicate it to the requesting device. For example the server may be a stand-alone server(s), a distributed server system, etc. The server calculates 306 the success rate indicator for the mobile device based on one or more of the factors, and transfers 308 it to the first device. In other embodiments the success rate indicator may be transferred directly to the target mobile device or to another device, but in the present embodiment the success rate indicator is provided to the first device that also provided at least some of the information used by the server in calculating the success rate indicator.

If the success rate is not deemed acceptable, the software may not be downloaded to the mobile device 312. For example, if the success rate is sufficiently low, the user of the first device may opt not to attempt to download and/or use the software on the target mobile device, and therefore will not initiate the download process. In another embodiment, this may be determined automatically, such that the download process will not be automatically initiated (e.g., via a monitoring program on the first device) if the success rate indicator is below a threshold. Alternatively, if the success rate indicator is acceptable as determined at decision block 310, the first device initiates 314 the downloading of the desired software to the mobile device.

As indicated above, detecting the download and/or execution success rate can be based on various information. By detecting the download/execution success rate based on such information and dynamically monitoring this kind of service, one aspect of the invention facilitates more reliable pass-throughs from the system (successful downloads). These limits and measurement may be performed automatically and the encoding can be changed, for example, when the success rate is decreasing or there are some restrictions in the system. For example, if it seems that during higher network traffic periods the successful download success rate is dropping due to network latency, then during those "rush hours" the encoding can be tightened so that the file size is smaller and the user experience (from a downloading perspective) can remain as high as when the network is not experiencing such high network traffic and/or higher latency effects.

For example, in one embodiment, the server can modify the encoding of the download content based on the calculated success rate. In one particular example, the server can implement tighter encoding to reduce the content file size when the network traffic is higher which would otherwise cause the calculated success rate to decrease. In another embodiment, tighter encoding may be implemented to reduce the file size when the network traffic is anticipated to be higher, thereby automatically changing the encoding resulting in an increase in the calculated success rate. Thus, the system and/or service can provide a greater benefit for the end users by using this and other information to automatically adjust download considerations to increase the likely download success rate.

Figure 4:
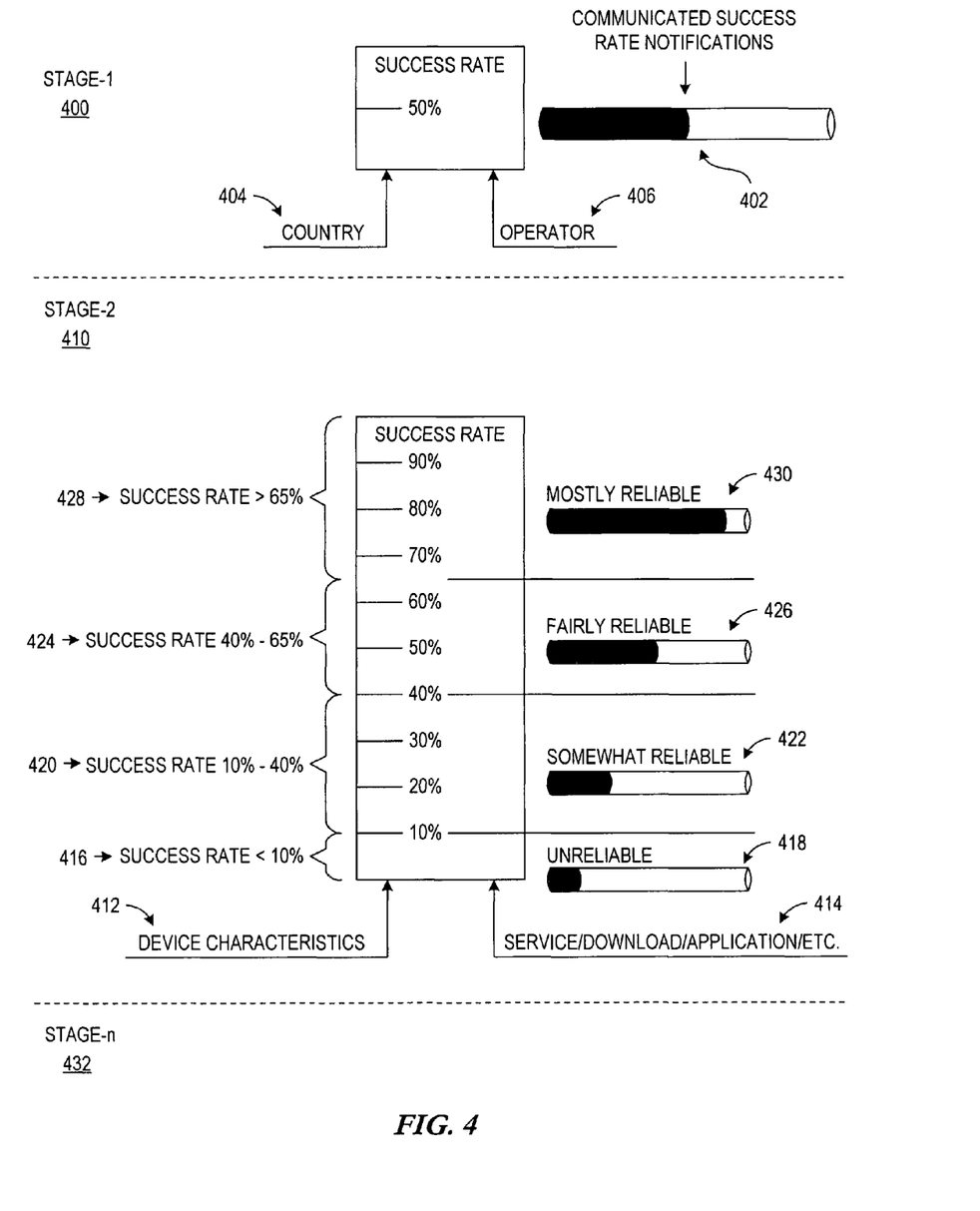
FIG. 4 generally illustrates the server's receipt of relevant information/factors and the consequent calculation of a likely success rate for ultimate consideration by a device and/or user.

FIG. 4 generally illustrates the server's receipt of relevant information/factors and the consequent calculation of a likely success rate for ultimate consideration by a device and/or user. The embodiment of FIG. 4 contemplates various "stages," meaning that different success rates may be provided in response to the server's receipt of additional or different information. By way of example and not of limitation, the exemplary stage-1 400 may provide an initial success rate 402 that is based on a first set of information, such as the designation of the country 404 and network operator 406. In one embodiment, trials from devices originating from that country/operator are taken into consideration for the success rate history value.

The success rate may be modified if different and/or additional information is provided, which is shown at stage-2 410. For example, if the device characteristics 412 are now included in the success rate calculation (in addition to the country 404 and operator 406), a newly calculated success rate can be provided. In the exemplary stage-2 410, the device characteristics 412 for that identified service/download/application 414 can be considered. For example, certain messages can be presented depending on the success rate when the device characteristics 412 are considered. In one embodiment, if that device has some history (e.g., three or more trials), a number of success rate ranges can be identified that correspond to different success rates based on the new information. For example, if the success rate is calculated to be less than 10% as shown at level 416, the combination of this device and the desired service/download/application/etc. can be indicated to be relatively unreliable 418. If the success rate is calculated to be between 10% and 40% as shown at level 420, the combination of this device and the desired service/download/application/etc. can be indicated to be somewhat reliable 422. If the success rate is calculated to be between 40% and 65% as shown at level 424, the combination of this device and the desired service/download/application/etc. can be indicated to be fairly reliable 426. Finally, if the success rate is calculated to be greater than 65% as shown at level 428, the combination of this device and the desired service/download/application/etc. can be indicated to be reliable 430. Additional stages-n 432 may similarly be considered, based on still further information (e.g., network restrictions, geographic information, etc.). Alternatively, all of the information can be considered as a whole, providing a single success rate indication. It should also be noted that the server(s) can change the encoding or perform other actions to attempt to increase the success rate at any stage, such as tightening the encoding to reduce the file size during periods of high traffic or where the device capabilities indicate a more limited memory capacity in the device.

Figure 5:
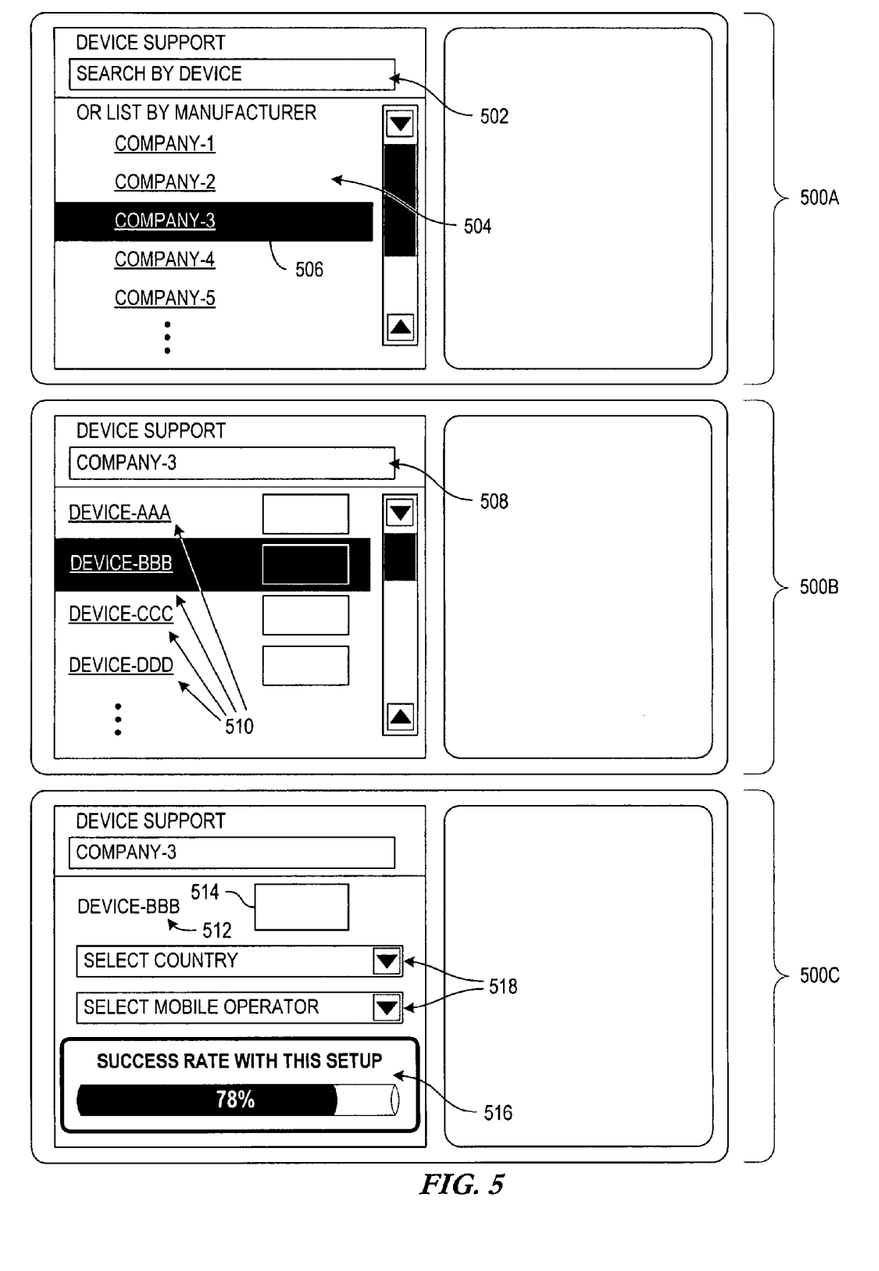
FIG. 5 illustrates a representative working example in which at least terminal-related information is provided by a computing device to ultimately obtain an indication of the likely success rate for downloading and/or using the identified content on a target device.

FIG. 5 illustrates a representative working example in which at least terminal-related information is provided by a computing device to ultimately obtain an indication of the likely success rate for downloading and/or using the identified content on a target device. A first screen 500A is presented that includes some user input area(s) in which the user can identify terminal-related information. In the illustrated embodiment, the user input (UI) includes a text-entry area 502 where a user can enter, for example, a device type, model, etc. Alternatively, a UI area 504 enables the user to identify the target device manufacturer in a list of such manufacturers. In the example of FIG. 5, it is assumed that the user selected "COMPANY-3" 506 as the manufacturer of the target mobile device, which in response presents screen 500B which identifies 508 the selected manufacturer, and lists one or more available products 510 associated with that manufacturer. In the illustrated embodiment, the user identifies DEVICE-BBB as the appropriate target device. In response, screen 500C is presented that identifies the selected device 512, and may optionally provide alternative or additional identifying information for that device such as an image 514. This information, i.e., the target device type, is provided to the server for use in generating the proposed success rate, which is then presented as shown at presentation area 516. Additional information entry areas 518 may also be provided to enter additional information which may then result in an updated success rate indication in the presentation area 516 or similar presentation area. As previously indicated, numerous other information items may additionally or alternatively be used in the generation of the success rate indication.

As indicated above, the server(s) can not only calculate and provide an anticipated success rate, but in some embodiments may also take action to increase the chances of download/execution success if the success rate appears to be inadequate. One example indicated above involves changing the encoding of the software or other content to reduce its size to increase the success rate and accordingly the chances of successful downloading and/or use. Other examples are for the server to change the content characteristics to increase the likelihood of successful download/execution, such as to reduce the resolution of an image or video, reduce audio quality, provide a scaled-down version of a software item rather than the entire software item, provide older versions of content/software, etc. Stated differently, the success rate can be used to detect different kinds of mobile-related content types, meaning that based on content and context as well as technical capabilities of the device, there may be more ideal solutions to provide certain types and size of content to certain categories of users with certain categories of terminals. These different combinations can be determined at the server to determine which software/content to deliver, and/or may be provided to the user as alternative options to enable the receiving device and/or user to select the desired download content and/or procedure. In any event, as indicated above, the server can utilize the anticipated success rate to take action to improve the calculated success rate.

Figure 6:
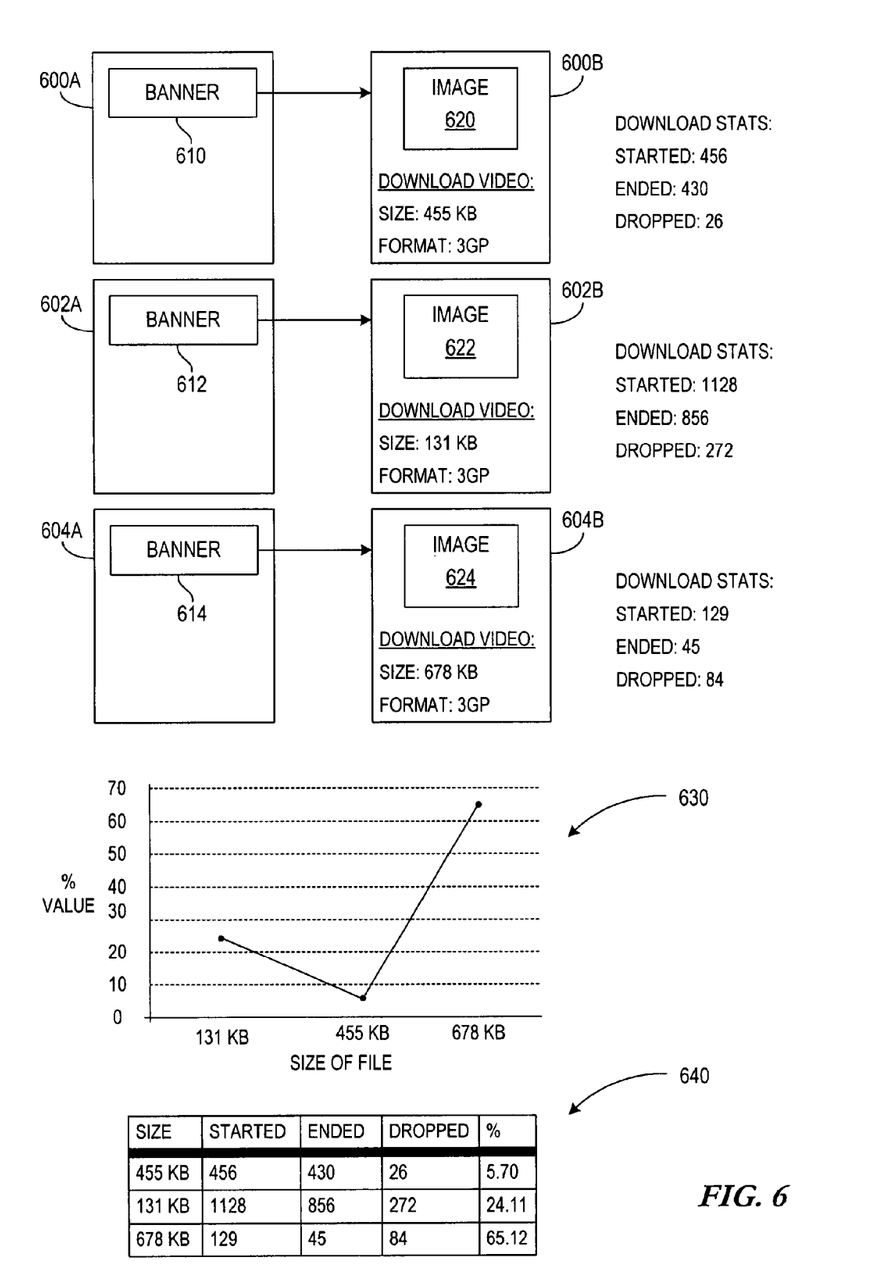
FIG. 6 illustrates a representative example of a statistical analysis and recording at the server.

FIG. 6 illustrates a representative example of a statistical analysis and recording at the server. FIG. 6 illustrates three different documents or pages 600A, 602A, 604A or other presented information from which a software/content selection may be made. In each of the pages, exemplary corresponding banners 610, 612, 614 are depicted which represents at least a link that user selection thereof (e.g., via a computing device) initiates corresponding screens 600B, 602B, 604B, which may include links or other presentations such as the images 620, 622, 624. The banners 610, 612, 614 may be textual, images, graphical, etc. The overall download success rate may be determined, for example, based on the current terminal capabilities as well as how interesting (e.g., selection clicks/viewers) the content and/or the banners 610, 612, 614 that point to the content are.

Based on the number of dropped downloads, a parameter value can be identified on a case-by-case basis, and then treated as a common guideline for how to manage certain kinds of content with different kinds of markets or terminals or a combination thereof. FIG. 6 represents an example of three different cases in which downloads occur, which can then be analyzed and used as such a common guideline for how to work with certain kinds of content with different kinds of markets/terminals or a combination thereof. More particularly, it is assumed that a user selects the banner 610 of page 600A, thereby presenting information to download a video (for example). An image 620 may be presented corresponding to the video. Information such as the file size, format, and/or other information may be presented to the user. If the user opts to download the video (or other content), the results can be recorded and considered with other attempts to obtain that content. In the example of page 600A/600B, the illustrated download statistics indicate that 456 attempts to download that video have occurred, of which 430 properly ended thereby indicating that 26 download attempts failed (e.g., the transmission/content was "dropped"). Similarly, for page 602A/602B, the illustrated download statistics indicate that 1128 attempts to download that video have occurred, of which 856 properly ended thereby indicating that 272 download attempts failed. Finally, regarding page 604A/604B, the illustrated download statistics indicate that 129 attempts to download that video have occurred, of which 45 properly ended thereby indicating that 84 download attempts failed.

Such download statistics are shown graphically at graph 630, which shows the percentage of dropped downloads versus the size of the file. As the graph helps to identify, the most successful downloads based on the lowest percentage of dropped downloads occurred with the download initiated from page 600B involving a 455 KB download. This is also shown in table form at table 640. In one embodiment of the invention, this statistical information can be used to create a common guideline as to how to work with certain kinds of content with different kinds of markets or terminals or a combination thereof.

Figure 7A:
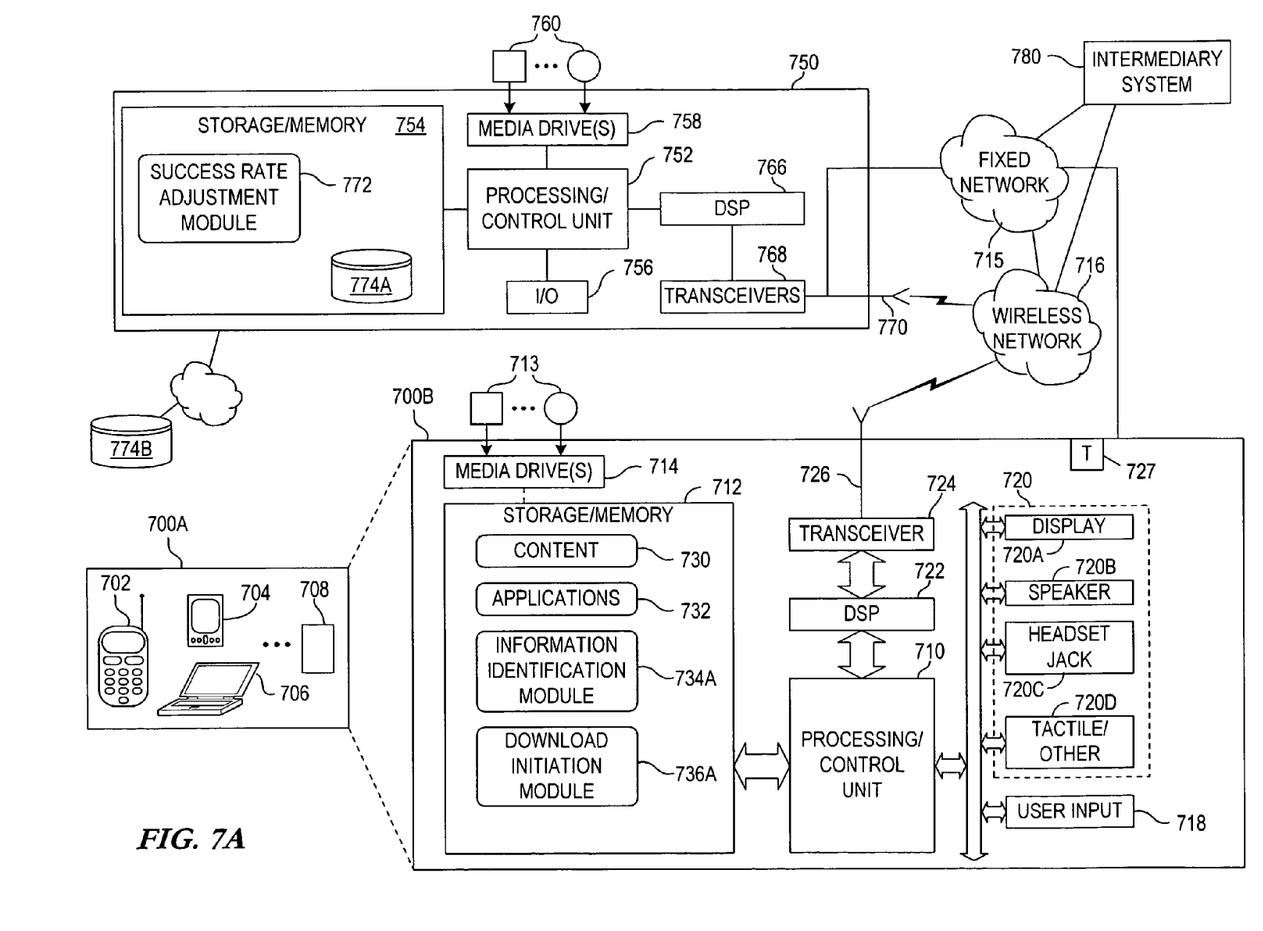
FIGS. 7A and 7B illustrate representative device and server systems in which the present invention may be implemented or otherwise utilized.
Figure 7B:
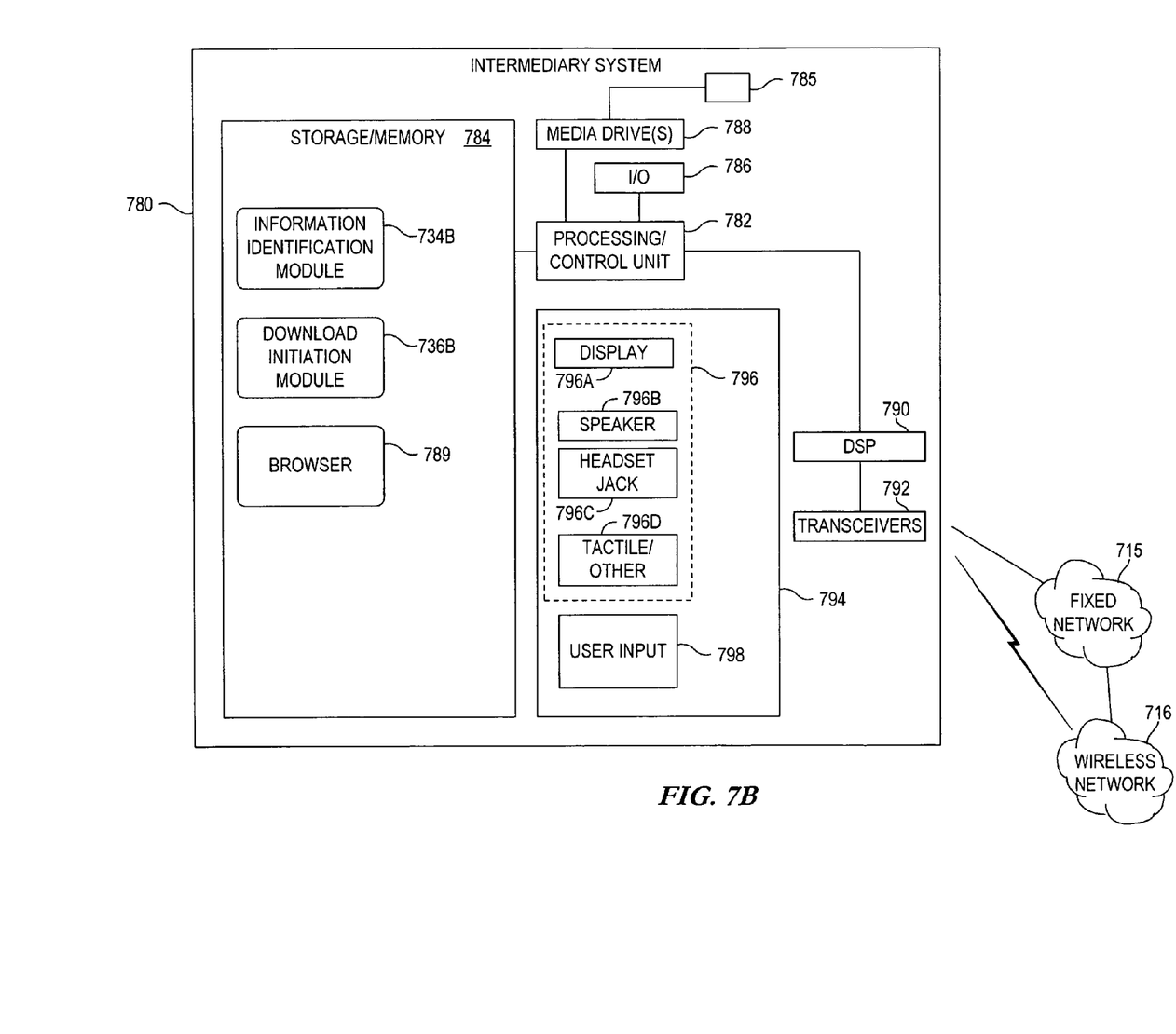

FIGS. 7A and 7B illustrate representative device and server systems in which the present invention may be implemented or otherwise utilized. Like reference numbers are used in FIGS. 7A and 7B where appropriate. In the embodiment of FIGS. 7A and 7B, the target device is a mobile device 700A, the entity providing the success rate indication is the server 750, and an intermediary system 780 is provided to furnish the relevant information regarding the target mobile device 700A to the server 750 and in turn receive the success rate indication.

The device 700A represents any device capable of performing the target device functions previously described. While the target device may be a non-mobile device, the target device is a mobile device 700A capable of communicating over-the-air (OTA) with wireless networks and/or capable of communicating via wired networks. By way of example and not of limitation, the device 700A includes mobile phones (including smart phones) 702, personal digital assistants 704, computing devices 706, and other networked terminals 708.

The representative terminal 700A utilizes computing/processing systems to control and manage the conventional device activity as well as the device functionality provided by the present invention. For example, the representative wireless terminal 700B includes a processing/control unit 710, such as a microprocessor, controller, reduced instruction set computer (RISC), or other central processing module. The processing unit 710 need not be a single device, and may include one or more processors. For example, the processing unit may include a master processor and one or more associated slave processors coupled to communicate with the master processor.

The processing unit 710 controls the basic functions of the device 700B as dictated by programs available in the program storage/memory 712. The storage/memory 712 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 712 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 713, such as disks, CD-ROM, DVD, or the like, which are read by the appropriate interfaces and/or media drive(s) 714. The relevant software for carrying out terminal operations in accordance with the present invention may also be transmitted to the device 700B via data signals, such as being downloaded electronically via one or more networks, such as the data network 715 or other data networks, and perhaps an intermediate wireless network(s) 716 in the case where the device 700A/700B is a wireless device such as a mobile phone.

For performing other standard terminal functions, the processor 710 is also coupled to user input interface 718 associated with the device 700B. The user input interface 718 may include, for example, a keypad, function buttons, joystick, scrolling mechanism (e.g., mouse, trackball), touch pad/screen, and/or other user entry mechanisms.

A user interface (UI) 720 may be provided, which allows the user of the device 700A/B to perceive information visually, audibly, through touch, etc. For example, one or more display devices 720A may be associated with the device 700B. The display 720A can display web pages, images, video, text, links, television, visual radio information and/or other information. A speaker(s) 720B may be provided to audibly present instructions, information, radio or other audio broadcasts, etc. A headset/headphone jack 720C and/or other mechanisms to facilitate audio presentations may also be provided. Other user interface (UI) mechanisms can also be provided, such as tactile 720D or other feedback.

The exemplary mobile device 700B of FIG. 7 also includes conventional circuitry for performing wireless transmissions over the wireless network(s) 716. The DSP 722 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 724 includes at least a transmitter and receiver, thereby transmitting outgoing wireless communication signals and receiving incoming wireless communication signals, generally by way of an antenna 726. Where the device 700B is a non-mobile or mobile device, it may include a transceiver (T) 727 to allow other types of wireless, or wired, communication with networks such as the Internet. For example, the device 700B may communicate via a proximity network (e.g., IEEE 802.11 or other wireless local area network), which is then coupled to a fixed network 715 such as the Internet. Peer-to-peer networking may also be employed. Further, a wired connection may include, for example, an Ethernet connection to a network such as the Internet. These and other manners of ultimately communicating between the device 700A/B and the server(s) 750 may be implemented.

In one embodiment, the storage/memory 712 stores the various client programs and data used in connection with the present invention. For example, the storage/memory 712 can store content 730, applications 732 or other software received from the server 750. For example, applications or other software ultimately received by the server 750 or another content server can be stored as the applications 732. Similarly, the device 700B can ultimately receive software upgrades to existing software 730/732 stored in the storage/memory 712. In embodiments where the mobile device itself provides the information for use by the server 750 in calculating a success rate indication, the device 700B may also include an information identification module 734A to provide the information, and/or a download initiation module 736A to initiate the download from the server 750 or other content server. These applications 730 and other modules 734A, 736A may be separate modules operable in connection with the processor 710, may be a single module performing each of these functions, or may include a plurality of such modules performing the various functions. In other words, while the modules are shown as multiple software/firmware modules, these modules may or may not reside in the same software/firmware program. It should also be recognized that one or more of these functions may be performed using hardware. These modules are representative of the types of functional and data modules that may be associated with a terminal in accordance with the invention, and are not intended to represent an exhaustive list. Also, other functions not specifically shown may be implemented by the processor 710.

FIG. 7 also depicts a representative computing system 750 operable on the network. One or more of such systems 750 may be available via a network(s) such as the wireless 716 and/or fixed network 715. In the illustrated embodiment, the computing system 750 represents the server(s) that creates the success rate indicator(s) based on the terminal characteristics, terminal capabilities, network restrictions, geographic considerations, historical information and/or other information as described herein. The system 750 may be a single system or a distributed system. The illustrated computing system 750 includes a processing arrangement 752, which may be coupled to the storage/memory 754. The processor 752 carries out a variety of standard computing functions as is known in the art, as dictated by software and/or firmware instructions. The storage/memory 754 may represent firmware, media storage, and/or memory. The processor 752 may communicate with other internal and external components through input/output (I/O) circuitry 756. The computing system 750 may also include media drives 758, such as hard and floppy disk drives, CD-ROM drives, DVD drives, and other media drives capable of reading and/or storing information. In one embodiment, software for carrying out the operations at the computing system 750 in accordance with the present invention may be stored and distributed on CD-ROM, diskette, magnetic media, removable memory, or other form of media capable of portably storing information, as represented by media devices 760. Such software may also be transmitted to the system 750 via data signals, such as being downloaded electronically via a network such as the data network 715, Local Area Network (LAN) (not shown), wireless network 716, and/or any combination thereof.

In accordance with one embodiment of the invention, the storage/memory 754 and/or media devices 760 store the various programs and data used in connection with the present invention. For example, in one embodiment the storage 754 includes a success rate computation module 772 that is configured to calculate the success rate indicators based on the provided information. The success rate computation module 772 may also take action to cause or attempt to change (e.g., increase) the calculated success rate, such as tightening the encoding to reduce file size, etc. Additionally, the storage/memory 754 may include the database 774A for storing the information from various devices pertaining to their respective terminal characteristics (e.g., manufacturer, model, etc.), terminal capabilities (e.g., screen size, resolution, memory capacity, etc.), network-related information (e.g., traffic conditions/congestion, etc.), and/or the like. The database 774A may also store content that is ultimately to be delivered to the device 700A/B, if the server 750 is also serving as the content server. Alternatively, a content database may be hosted elsewhere such as depicted by database 774B accessible via a network or otherwise.

The illustrated computing system 750 also includes DSP circuitry 766, and at least one transceiver 768 (which is intended to also refer to discrete transmitter/receiver components). While the server 750 may communicate with the data network 715 via wired connections, the server may also/instead be equipped with transceivers 768 to communicate with wireless networks 716 whereby an antenna 770 may be used.

FIG. 7B illustrates a representative computing system that may be used to provide the relevant information pertaining to the mobile device 700A/B that is used by the server 750 to generate a success rate indicator. The computing system, shown as the intermediary system 780, may be a implemented using a general purpose or special purpose computing system. The intermediary system 780 can communicate with the server 750 using direct connections (e.g., Ethernet, USB, firewire, serial communication, etc.), or via networks such as the fixed 715 and/or wireless network 716, peer-to-peer networks, or any other manner of communicating.

The illustrated computing system 780 includes a processing arrangement 782, which may be coupled to the storage/memory 784. The processor 782 carries out a variety of standard computing functions as is known in the art, as dictated by software and/or firmware instructions. The storage/memory 784 may represent firmware, media storage, and/or memory. The processor 782 may communicate with other internal and external components through input/output (I/O) circuitry 756. The computing system 780 may also include media drives 788, such as hard and floppy disk drives, CD-ROM drives, DVD drives, and other media capable of reading and/or storing information. In one embodiment, software for carrying out the operations at the computing system 780 in accordance with the present invention may be stored and distributed on CD-ROM, diskette, magnetic media, removable memory, or other form of media capable of portably storing information, as represented by media devices 785. Such software may also be transmitted to the system 780 via data signals, such as being downloaded electronically via a network such as the data network 715, Local Area Network (LAN) (not shown), wireless network 716, and/or any combination thereof.

In accordance with one embodiment of the invention, the storage/memory 784 and/or media devices 785 store the various programs and data used in connection with the present invention. For example, in one embodiment the storage 784 includes an information identification module 734B to obtain the information about the target mobile device 700A/B. In one embodiment, this information is collected by way of a user interacting with the information identification module 734B via a user interface, such as a graphical user interface (GUI), text entry, voice commands, etc. It should be noted that the information identification module 734B may be hosted at the server 750, whereby the user accesses the server's information identification module 734B via a browser 789 or other analogous program. The illustrated intermediary system 780 also includes a download initiation module 736B used to initiate the download or other delivery of the content to the target mobile device 700A/B.

The illustrated computing system 780 also includes DSP circuitry 790, and at least one transceiver 792 (which is intended to also refer to discrete transmitter/receiver components). While the computing device 780 may communicate with the data network 715 via wired connections, it may also/instead be equipped with transceivers 768 to communicate with wireless networks 716. The system 780 also includes a user interface 794 that includes a user output interface 796 and user input interface 798. The user input interface 798 may include, for example, a keypad, function buttons, joystick, scrolling mechanism (e.g., mouse, trackball), touch pad/screen, and/or other user entry mechanisms. The user output 796 allows the user of the device 700A/B to perceive information visually, audibly, through touch, etc. For example, one or more display devices 796A may be associated with the system 780. The display 796A can display web pages, images, video, text, links, television, visual radio information and/or other information. A speaker(s) 796B may be provided to audibly present instructions, information, etc. A headset/headphone jack 796C and/or other mechanisms to facilitate audio presentations may also be provided. Other user interface (UI) mechanisms can also be provided, such as tactile 796D or other feedback.

Hardware, firmware, software or a combination thereof may be used to perform the functions and operations in accordance with the invention. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

From the description provided herein, those skilled in the art are readily able to combine software created as described with appropriate general purpose or special purpose computer hardware to create a computing system and/or computing subcomponents embodying the invention, and to create a computing system(s) and/or computing subcomponents for carrying out the method(s) of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto and that which one of ordinary skill in the art can determine based on the description herein.

What is claimed is:

1. A method, comprising:
   determining, by a processor, to provide to a network element one or more attributes of a device; and
   receiving an anticipated success indication comprising an indication of a likelihood of success for at least one of transferring content to the device and rendering software in the device, wherein the anticipated success indication is based at least in part on one or more of the attributes and one or more historical success rates for transferring content and/or rendering software for other devices having one or more attributes similar to corresponding attributes of the device.

2. The method of claim 1, wherein the anticipated success indication is received by one or more of a proxy apparatus and the device.

3. The method of claim 1, wherein the anticipated success indication is further based on one or more network attributes of a network over which the content and/or software are to be transferred to the device.

4. The method of claim 1, further comprising:
   comparing the received anticipated success indication to a threshold success indication;
   and facilitating a selective initiation of at least one of the transferring of the content to the device and the rendering of the software in the device based at least in part on the comparison.

5. An apparatus, comprising:
   at least one processor; and
   at least one memory including computer program code for one or more programs,
   the at least one memory and the computer program code configured to, with the at least one processor, cause the apparatus to perform at least the following,
   determine to provide to a network element one or more attributes of a device; and
   receive an anticipated success indication comprising an indication of a likelihood of success for at least one of transferring content to the device and rendering software in the device, wherein the anticipated success indication is based at least in part on one or more of the attributes and one or more historical success rates for transferring content and/or rendering software for other devices having one or more attributes similar to corresponding attributes of the device.

6. The apparatus of claim 5, wherein the apparatus comprises one or more of a proxy apparatus and the device.

7. The apparatus of claim 5, wherein the anticipated success indication is further based on one or more network attributes of a network over which the content and/or software are to be transferred to the device.

8. The apparatus of claim 5, wherein the apparatus is further caused to:
   compare the received anticipated success indication to a threshold success indication; and
   facilitate a selective initiation of at least one of the transferring of the content to the device and the rendering of the software in the device based at least in part on the comparison.

9. A method, comprising:
   receiving, by a processor of a network element, one or more attributes of a device;
   facilitating, by the processor, a determination of an anticipated success indication comprising an indication of a likelihood of success for at least one of transferring content to the device and rendering software in the device, wherein the anticipated success indication is based at least in part on one or more of the attributes and one or more historical success rates for transferring content and/or rendering software for other devices having one or more attributes similar to corresponding attributes of the device; and
   determining to transmit the anticipated success indication to the device.

10. The method of claim 9, wherein the anticipated success indication is transmitted to one or more of a proxy apparatus and the device.

11. The method of claim 9, wherein the anticipated success indication is further based on one or more network attributes of a network over which the content and/or software are to be transferred to the device.

12. The method of claim 9, further comprising:
    facilitating a selective initiation of at least one of the transferring of the content to the device and the rendering of the software in the device based at least in part on a comparison of the anticipated success indication to a threshold success indication.

13. An apparatus, comprising:
    at least one processor; and
    at least one memory including computer program code for one or more programs,
    the at least one memory and the computer program code configured to, with the at least one processor, cause the apparatus to perform at least the following,
    receive one or more attributes of a device;
    determine an anticipated success indication comprising an indication of a likelihood of success for at least one of transferring content to the device and rendering software in the device, wherein the anticipated success indication is based at least in part on one or more of the attributes and one or more historical success rates for transferring content and/or rendering software for other devices having one or more attributes similar to corresponding attributes of the device; and determine to transmit the anticipated success indication to the device.

14. The apparatus of claim 13, wherein the anticipated success indication is transmitted to one or more of a proxy apparatus and the device.

15. The apparatus of claim 13, wherein the anticipated success indication is further based on one or more network attributes of a network over which the content and/or software are to be transferred to the device.

16. The apparatus of claim 13, wherein the apparatus is further caused to:

facilitate a selective initiation of at least one of the transferring of the content to the device and the rendering of the software in the device based at least in part on a comparison of the anticipated success indication to a threshold success indication.

* * * * *